Figure 1:
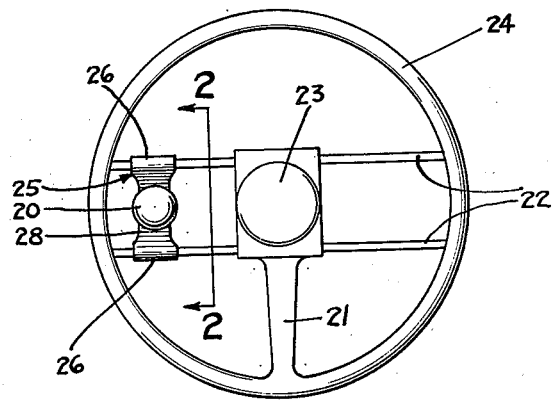

Aug. 25, 1942.   J. D. VILLAS   2,294,011

STEERING WHEEL

Original Filed Aug. 8, 1938

INVENTOR
JOHN D. VILLAS
By Paul, Paul Moore
ATTORNEYS

Patented Aug. 25, 1942

2,294,011

UNITED STATES PATENT OFFICE 2,294,011

STEERING WHEEL

John D. Villas, Minneapolis, Minn.

Original application August 8, 1938, Serial No. 223,655. Divided and this application December 21, 1939, Serial No. 310,401

2 Claims. (Cl. 74—557)

This invention relates to new and useful improvements in steering wheels and more particularly to steering wheels comprising a pair of spaced rods which serve as spokes to secure the wheel rim to the usual hub of the steering wheel.

An object of the present invention is to provide a hand knob adapted to be adjustably secured to a steering wheel of the type comprising a pair of spaced rods which serve as spokes to secure the rim to the wheel hub, said knob comprising a bracket having means for adjustably securing it to said rods whereby it may be longitudinally adjusted thereon to vary the spacing between the knob and the wheel rim.

A further object is to provide a simple and inexpensive bracket for supporting a hand knob on the steering wheel, whereby the knob may be radially adjusted on the wheel to properly position it with respect to the wheel rim.

The present application is a division of my co-pending application, Serial No. 223,655, now Patent No. 2,187,764, filed August 8, 1938.

Other objects of the invention will appear from the following description and accompanying drawing and will be pointed out in the annexed claims.

In the accompanying drawing, there has been disclosed a structure designed to carry out the various objects of the invention, but it is to be understood that the invention is not confined to the exact features shown as various changes may be made within the scope of the claims which follow.

Figure 2:
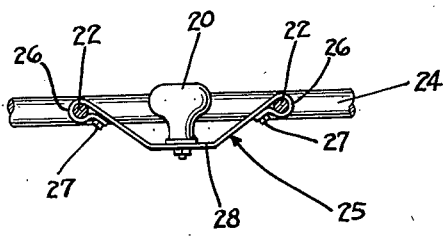

In the drawing:

Figure 1 is a plan view of the steering wheel showing the knob supporting bracket attached thereto; and Figure 2 is a detail sectional view on the line 2—2 of Figure 1.

In the selected embodiment of the invention here shown, there is illustrated in Figure 1, for purposes of disclosure, a steering wheel comprising the usual hub 23 and rim 24. The rim is shown secured to the hub by a pair of spaced parallel rods 22, which serve as spokes. The intermediate portions of said rods 22 are suitably secured to the hub 23 and the terminals thereof to the rim 24. An additional spoke 21 may be provided, if desired, for further supporting the lower portion of the wheel, when viewed as shown in Figure 1.

An important feature of the present invention resides in the provision of means for attaching a suitable hand knob 20 to the rods 22 of the wheel, whereby said knob may be longitudinally adjusted thereon to vary the spacing between the knob and the wheel rim. The knob 20 is shown rotatably mounted on a suitable bracket, generally indicated by the numeral 25. The bracket 25 has cylindrical guides or hubs 26 at its ends adapted to receive the rods 22, as shown.

In the form shown in Figure 2, the bracket 25 may be constructed of flat metal having its opposite end portions suitably formed or bent, as shown in Figure 2, to provide the guides 26. Suitable screws or bolts 27 may be provided for securing the hubs 26 to the rods 22, thereby to support the bracket 25 in fixed adjusted position upon the rods 22.

Another feature of the invention resides in the novel shape of the bracket 25 which, it will be noted by reference to Figure 2, has its intermediate portion 28 depressed to the extent that the horizontal plane of the grip portion of the knob 20 is disposed substantially in the horizontal plane of the wheel rim, as best shown in Figure 2. By thus depressing the intermediate portion of the bracket 25, the knob will be so located with respect to the rim of the wheel, that there is little danger of the driver's sleeve catching in the knob, when the driver spins the wheel, as frequently happens, when using knobs which have their grip portions disposed well above the plane of the rim.

It is to be understood that the bracket may be otherwise constructed, and may be made of any material found suitable for the purpose. The means for securing the bracket to the rods 22 may also be varied, as desired, without departing from the scope of the invention. By adjustably securing the bracket to the rods, as hereinbefore stated, it will be noted that the spacing between the knob and the adjacent portion of the wheel rim may readily be varied to suit conditions, by simply loosening the clamping elements or screws 27 and longitudinally adjusting the bracket 25 upon the rods 22.

I claim as my invention:

1. A steering wheel comprising a rim, a hub, and a pair of spaced parallel rods having their terminals suitably secured to the rim and the portions intermediate their ends fixedly secured to the hub whereby said rods serve as spokes between the rim and hub, a bracket having tubular end portions receiving said rods and whereby the bracket may be radially adjusted on the wheel, and means for securing the bracket in adjusted position.

2. A steering wheel comprising a rim, a hub, and a pair of spaced parallel rods having their terminals suitably secured to the rim and their central portions fixedly secured to the hub whereby said rods serve as spokes between the rim and hub, a bracket having tubular end portions slidably receiving said rods, said tubular end portions being split and having clamping screws whereby they may be contracted to secure the bracket to the rods in adjusted position, a hand knob secured to said bracket intermediate its ends, and the intermediate portion of said bracket being depressed below the axis of said rods, whereby the grip portion of the knob is disposed substantially in the plane of the wheel rim.

JOHN D. VILLAS.